United States Patent
Croxford

(10) Patent No.: US 10,839,222 B2
(45) Date of Patent: Nov. 17, 2020

(54) VIDEO DATA PROCESSING

(71) Applicant: Apical Ltd, Cambridge (GB)

(72) Inventor: Daren Croxford, Swaffham Prior (GB)

(73) Assignee: APICAL LIMITED, Cambridge (GB)

( * ) Notice: Subject to any disclaimer, the term of this patent is extended or adjusted under 35 U.S.C. 154(b) by 110 days.

(21) Appl. No.: 16/140,287

(22) Filed: Sep. 24, 2018

(65) Prior Publication Data

US 2020/0097728 A1   Mar. 26, 2020

(51) Int. Cl.
- *G06K 9/62* (2006.01)
- *G06K 9/00* (2006.01)
- *G06N 5/04* (2006.01)
- *G06N 3/08* (2006.01)

(52) U.S. Cl.
CPC ..... *G06K 9/00718* (2013.01); *G06K 9/00744* (2013.01); *G06K 9/6232* (2013.01); *G06N 3/08* (2013.01); *G06N 5/046* (2013.01)

(58) Field of Classification Search
CPC ........... G06K 9/00718; G06K 9/00744; G06K 9/6232; G06N 3/08; G06N 5/046
See application file for complete search history.

(56) References Cited

U.S. PATENT DOCUMENTS

2019/0294729 A1* 9/2019 Jiang ................... G06F 16/7844
2019/0385312 A1* 12/2019 Grundstrom .............. G06T 7/70

* cited by examiner

*Primary Examiner* — Dhaval V Patel
(74) *Attorney, Agent, or Firm* — EIP US LLP

(57) ABSTRACT

A method of processing video data includes processing a first frame to generate first feature data, which is processed to generate first classification data. The first classification data is used to determine that a first class of object is present in the first frame. The first feature data is processed to determine a portion of the first frame in which an object of the first class is located. A portion of a second frame is determined in dependence on the determined portion of the first frame. A second set of classifiers is selected on the basis of the first classification data. The second frame is processed to generate second feature data. A portion of the second feature data is processed, using the second set of classifiers, to generate second classification data for determining whether the first class of object is present in the determined portion of the second frame.

20 Claims, 7 Drawing Sheets

VIDEO DATA PROCESSING

BACKGROUND OF THE INVENTION

Technical Field

The present invention relates to methods and apparatus for processing video data representative of a video.

Background

Methods for processing video data, for example to identify classes of objects in a video, may be computationally intensive. It is desirable to reduce the processing demands of such methods.

SUMMARY OF THE INVENTION

In accordance with one aspect there is provided a computer-implemented method of processing video data representative of a video comprising a first frame and a second frame, the method comprising: processing first frame data associated with the first frame to generate first feature data representative of at least one feature of the first frame; processing the first feature data using a first set of classifiers, the first set of classifiers comprising a plurality of classifiers including a first classifier for a first class of object, to generate first classification data associated with a plurality of classes of object; determining, using the first classification data, that the first class of object is present in the first frame; processing the first feature data to determine a first portion of the first frame in which an object of the first class is located; determining a first portion of the second frame in dependence on the determined portion of the first frame; selecting a second set of classifiers on the basis of the first classification data, the second set of classifiers comprising at least one classifier including the first classifier; processing second frame data representative of the second frame to generate second feature data representative of at least one feature of the second frame; processing, using the second set of classifiers, a portion of the second feature data associated with the determined portion of the second frame to generate second classification data; and determining, using the second classification data, whether the first class of object is present in the first portion of the second frame.

In accordance with another aspect there is provided a system for processing video data representative of a video comprising a first frame and a second frame, the system comprising processing circuitry and memory circuitry, wherein the memory circuitry holds program code which, when executed by the processing circuitry, causes the system to: process first frame data associated with the first frame to generate first feature data representative of at least one feature of the first frame; process the first feature data using a first set of classifiers, the first set of classifiers comprising a plurality of classifiers including a first classifier for a first class of object, to generate first classification data associated with a plurality of classes of object; determine, using the first classification data, that the first class of object is present in the first frame; process the first feature data to determine a first portion of the first frame in which an object of the first class is located; determine a first portion of the second frame in dependence on the determined portion of the first frame; select a second set of classifiers on the basis of the first classification data, the second set of classifiers comprising at least one classifier including the first classifier; process second frame data representative of the second frame to generate second feature data representative of at least one feature of the second frame; process, using the second set of classifiers, a portion of the second feature data associated with the first portion of the second frame to generate second classification data; and determine, using the second classification data, whether the first class of object is present in the first portion of the second frame.

In accordance with another aspect there is provided a computer program product comprising instructions which, when executed by processing circuitry of a computing device, cause the computing device to perform a method of processing video data representative of a video comprising a first frame and a second frame, the method comprising: processing first frame data associated with the first frame to generate first feature data representative of at least one feature of the first frame; processing the first feature data using a first set of classifiers, the first set of classifiers comprising a plurality of classifiers including a first classifier for a first class of object, to generate first classification data associated with a plurality of classes of object; determining, using the first classification data, that the first class of object is present in the first frame; processing the first feature data to determine a first portion of the first frame in which an object of the first class is located; determining a first portion of the second frame in dependence on the determined portion of the first frame; selecting a second set of classifiers on the basis of the first classification data, the second set of classifiers comprising at least one classifier including the first classifier; processing second frame data representative of the second frame to generate second feature data representative of at least one feature of the second frame; processing, using the second set of classifiers, a portion of the second feature data associated with the determined portion of the second frame to generate second classification data; and determining, using the second classification data, whether the first class of object is present in the first portion of the second frame.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Figure 1:
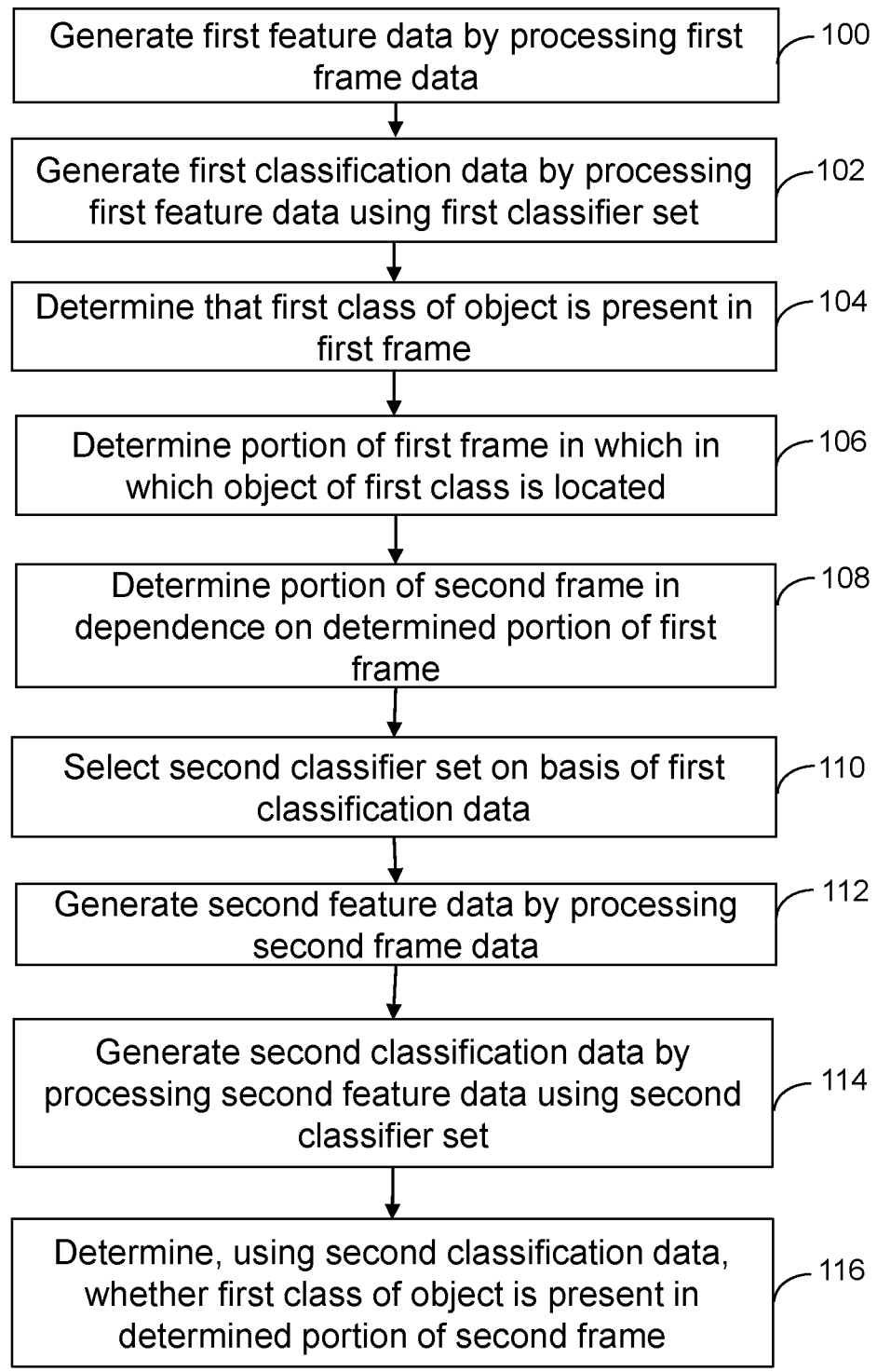
FIG. 1 is a flow diagram showing a method of processing video data according to examples.

Details of systems and methods according to examples will become apparent from the following description, with reference to the figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

In some examples, a video may be captured by a camera that is relatively stationary with respect to a scene or environment. In such examples, the magnitude of an expected displacement of an object in the scene from one frame to the next may be expected to be small, for example less than a certain predetermined value.

In other examples, a video may be obtained from a camera moving relative to an environment. Such a camera may have a known or measurable relative velocity with respect to the environment, for example the velocity of a camera relative to a fixed environment may be determined using global positioning system (GPS) measurements, accelerometers, a motor driver associated with the camera, or simultaneous location and mapping (SLAM) techniques. In some examples, a velocity of a camera relative to an environment may be determined or verified using video data generated by the camera. In some examples, a relative speed of a camera relative to an environment may be known to be less than a certain maximum relative speed.

In examples where a relative velocity between a camera and an environment is known or measured, objects within a video may be expected to move in a predictable manner from frame to frame. For example, if the relative velocity of a camera with respect to an environment is known, a predicted displacement from one frame to another frame of an object that is stationary relative to the environment can be determined based on the known relative velocity.

Processing a video, for example to perform object detection or image segmentation on frames of the video, typically involves a high computational cost. However, some of this processing may be redundant if a relative velocity associated with a camera is known, can be measured, or if a relative speed associated with a camera is known to be substantially zero or less than a certain maximum relative speed.

Some examples of processing a video, for example for object detection or image segmentation, includes a feature detection stage followed by a classification stage. The classification stage may use a significant fraction of the time taken and/or power consumed by the video processing, even in cases where the computational cost of the classification is significantly less than that of the feature detection stage. In an example where frames of a video are processed using a convolutional neural network (CNN), feature detection is performed by one or more convolutional layers of the CNN. The classification stage is performed by one or more fully-connected layers of the CNN. Although executing the convolutional layers may involve a significantly higher computational cost in terms of computing operations (for example, more than 90% or more than 95% of the total computational cost of executing the CNN), executing the convolutional layers involves highly regular computations and can executed by specialized processing circuitry that is optimized for performing such computations, for example a CNN accelerator. On the other hand, executing the fully-connected layers may have a significantly lower computational cost in terms of computing operations (for example, less than 10% or less than 5% of the total computational cost of executing the CNN), but the fully-connected layers may not be able to be executed by specialized circuitry and may instead be performed by other processing circuitry, for example a central processing unit (CPU) or a graphics processing unit (GPU). The other processing circuitry may take significantly more time to perform operations than a CNN accelerator, for example an order of magnitude more time in the case of operations for which the CNN accelerator is optimized. As a result, the power consumed and/or time taken to execute the fully-connected layers may be comparable or greater than the power consumed and/or time taken to execute the convolutional layers of the CNN.

Classification typically involves executing a separate classifier for each class of object to be classified in an image (for example, a frame in a video). In an example in which classification is performed by fully-connected layers of a CNN, each classifier corresponds to a different fully-connected kernel, for example implemented as a different output node of the CNN. Therefore, reducing the number of classifiers executed on a frame of a video, or on portions of the frame, reduces the computational cost of processing the video.

FIG. 1 shows an example of a method of processing video data representative of a video including a first frame and a second frame. Methods in accordance with FIG. 1 may be used to reduce the computational cost of object classification. The method of FIG. 1 may be implemented by the video processing system of FIG. 10 (described below) but may alternatively be implemented by other types of system having additional or different components to those shown in FIG. 10.

In examples according to FIG. 1, the second frame is subsequent to the first frame, though in other examples the first frame may be subsequent to the second frame. In an example in which the second frame is subsequent to the first frame, the second frame may be immediately consecutive to the first frame (with no intervening frames therebetween) or there may be one or more frames between the first frame and the second frame. A frame for example corresponds to a still image or picture. A series or sequence of frames, which typically represent a series of sequential images or pictures, can be considered to correspond to a video or a moving picture, for example a moving picture generated from observations of an environment made by an agent performing SLAM. A frame may include a plurality of pixels. In some examples, a video is composed of a series of frames, each frame corresponding to an observation made by an agent performing SLAM. The agent may process frames of the video to generate SLAM data representative of a map of an environment and a location of the agent within the environment. In some examples, frames of the video are received from a camera or image sensor. In other examples, frames may be retrieved from storage or received from another device or system.

At item 100 of FIG. 1, first feature data is generated by processing first frame data associated with the first frame. The first feature data is representative of at least one feature of the first frame. In some examples, generating first feature data includes processing the first frame data using one or more convolutional layers of a convolutional neural network (CNN). In such examples, the feature data may be representative of a feature map. An example of using a CNN to generate first feature data is discussed further below with reference to FIG. 4. In other examples, other image processing methods may be used to generate feature data, and accordingly the generated feature data may take different forms. For example, feature data may be generated in the form of feature descriptors such as a history of oriented gradients (HOG) or a discrete wavelet transform (DWT).

At item 102 of FIG. 1, first classification data is generated by processing the first feature data. The first feature data is processed using a first set of classifiers, the first set including a plurality of classifiers, including a first classifier for a first class of object. Accordingly, the first classification data is associated with multiple classes of object corresponding to the first set of classifiers. For example, the first classification data may assign a numerical value to each of the classes in the first set of classes. The nature of the classes of object will depend on the nature of the video and the application for which the video is being processed. In an example where the video data is processed for computer vision, a large number of classes may be included, for example tens or hundreds or thousands of classes. The breadth of each class will also depend on the specific example.

In one example, generating the first classification data includes processing the first feature data using one or more fully-connected layers of the CNN. An example of using a CNN to generate first classification data is discussed further below with reference to FIG. 4. In other examples, other classification methods may be employed to generate classification data from feature data, for example support vector machines (SVMs), k-nearest neighbor (k-NN) algorithms, or decision trees. The exact nature of the classification operation is not limited to these examples, and other operations may be used in examples similar to those described herein.

At item 104 of FIG. 1, the first classification data is used to determine that a first class of object is present in the first frame. In an example where the first classification data assigns a numerical value to each of a of a predetermined set of classes, determining that the first class of object is present in the first frame may include determining that the numerical value assigned to that class is greater than a threshold value, or satisfies another condition, for example a condition depending on the numerical values assigned to other classes of object.

At item 106 of FIG. 1, a first portion of the first frame is determined in which an object of the first class is located. The first portion of the first frame may be, for example, a rectangular box determined to contain the object of the first class, or may have a shape that depends on the object, for example in the case of image segmentation. In an example in which the first classification data is determined using a CNN, determining the first portion of the first frame may include processing the first classification data using a deconvolutional neural network (DCNN) associated with the CNN. An example of using a DCNN to determine a portion of a frame is discussed further below with reference to FIG. 5.

At item 108 of FIG. 1, a first portion of the second frame is determined in dependence on the first portion of the first frame. In an example in which a magnitude of a relative displacement associated with the first frame and the second frame is known to be relatively small or substantially zero, for example because a relative speed between a camera and an environment is known or determined to be zero or less than a certain maximum relative speed, the determined portion of the second frame may encompass a region of the second frame corresponding to the determined portion of the first frame. In the example shown in FIG. 2, a rectangular portion 118 of a first frame 120 is determined to contain an object of a first class. A second frame 122 has a corresponding rectangular region 124 with identical dimensions to the portion 118 of the first frame 120, and located and oriented within the second frame 122 identically to how the rectangular portion 118 of the first frame 120 is located and oriented within the first frame 120. A larger rectangular portion 126 encompasses the rectangular region 124, such that a border of the of the rectangular portion 126 defines a bounding box around the rectangular region 124. The size of the bounding box in a specific example will depend on the nature of the video, whether the camera associated is expected or known to be substantially stationary, or to have a speed relative an environment that does not exceed a certain value, and may alternatively or additionally depend on the class of object determined to be located within the rectangular portion 118 of the first frame 120. For example, objects within a certain class may be expected only to move slowly, whereas objects within a different class may move more quickly. A bounding box for an object of the slowly-moving class may therefore be smaller than a bounding box for an object of the more quickly-moving class. In some examples, a bounding box may be the same size as the region in which the object of the first class is determined to be located, for example in cases of objects that are expected to remain stationary with respect to the environment.

In some examples, determining the first portion of the second frame includes determining a relative displacement associated with the first frame and the second frame, and displacing the first portion of the first frame in accordance with the determined relative displacement. In some examples, a relative velocity of a camera relative to an environment may be measured or known, as described above, and a relative displacement between the first frame and the second frame may be determined from the measured or known relative velocity. In one example, frames of the video correspond to observations made by an agent performing SLAM, and the relative displacement is determined by processing frames of the video to generate SLAM data representative of a map of an environment and a location of the agent in the environment, and determining, using the generated SLAM data, the relative displacement associated with the first frame and the second frame.

Figure 2:
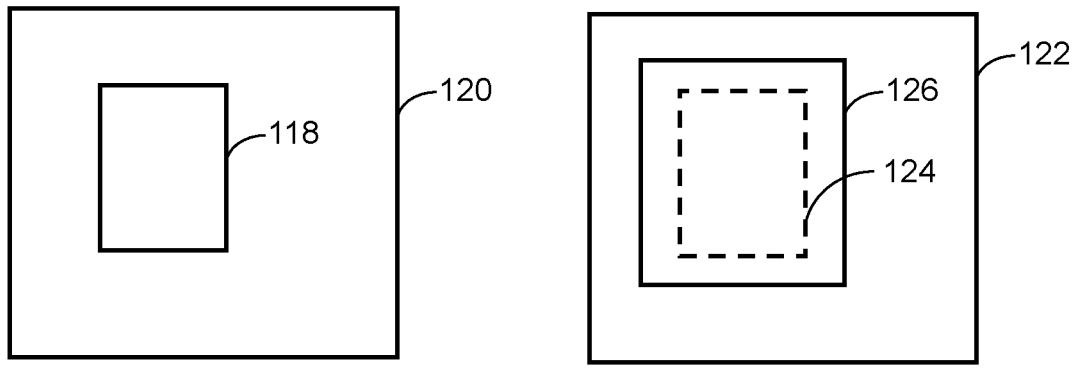
FIG. 2 shows frames of video data according to examples.
Figure 3:
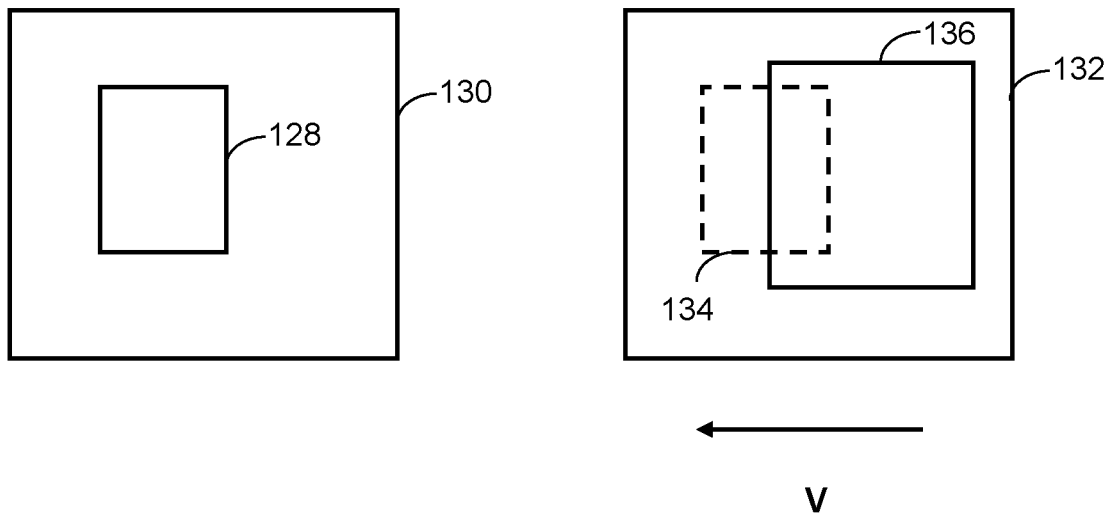
FIG. 3 shows frames of video data according to examples.

In the example shown in FIG. 3, a rectangular portion 128 of a first frame 130 is determined to contain an object of a first class. A second frame 132 has a corresponding rectangular region 134 with identical dimensions to the portion 118 of the first frame 120, and located and oriented within the second frame 122 identically to how the rectangular portion 118 of the first frame 120 is located and oriented within the first frame 120. A displaced rectangular portion 136 is determined by displacing the portion 128 of the first frame 130 (or, equivalently, the corresponding portion 134 of the second frame 132) in accordance with a known relative displacement associated with the first frame 130 and the second frame 132, which is determined from a known velocity v of a camera with respect to an environment and a known temporal separation of the first and second frames. In the object located within the portion 128 of the first frame remains stationary with respect to the environment, the object would be expected to appear within the displaced portion 136. In this example, the displaced portion 136 is larger than the portion 128 of the first frame, accounting for the object also moving relative to the environment, as described above with reference to FIG. 2. In other examples, a displaced portion of a second frame may have the same dimensions as the portion of the first frame in which the object is located.

At item 110 of FIG. 1, a second set of classifiers is selected on the basis of the first classification data. The second set of classifiers includes at least one classifier, including the first classifier associated with the first class of object. The first processing routine is selected for efficient processing of the portion of the second frame determined at item 110, as will be described in more detail hereafter.

At item 112 of FIG. 1, second feature data is generated by processing second frame data associated with the second frame. The second feature data is representative of at least one feature of the second frame. In some examples, the same feature detection operation is performed to generate the first and second feature data. In other examples, different feature detection operations may be used to generate the first and second feature data.

At item 114 of FIG. 1, second classification data is generated by processing a portion of the second feature data associated with the first portion of the second frame, using the selected second set of classifiers. In an example, the second set of classifiers includes only the first classifier. Accordingly, the second classification data is associated only with the first class of object, and includes, for example, a single number associated with the first class of object. In another example, the second set of classifiers includes also a second classifier, and accordingly the second classification data is further associated with a second class of object. In further examples, the second set of classifiers includes further classifiers, and may for example be a subset of the first set of classifiers. In an example in which the first classification data assigns a numerical value to each class of objects corresponding to the first set of classifiers, a subset of classifiers may be chosen to include classifiers assigned a numerical higher than a certain value, or sufficiently close to a certain numerical value according to predetermined criteria. A subset may alternatively include a predetermined number of classifiers, for example the classifiers associated with classes of objects assigned the highest numerical values in the first classification data.

At item 116 of FIG. 1, the second classification data is used to determine whether the first class of object is present in the first portion of the second frame. In an example, determining whether the first class of object is present in the first portion of the second frame includes comparing the second classification data with a portion of the first classification data corresponding to the first class of object. In such an example, the second classification data may include a numerical value assigned to the first class of object for the first portion of the second frame, and the portion of the first classification data may include a numerical value assigned to the first class of object for the first frame. The result of the comparison is then used to determine whether the first class of object is present in the determined portion of the second frame. For example, a numerical value assigned to the first class of object for the first portion of the second frame may be compared with a numerical value assigned to the first class of object for the first frame. If the values are sufficiently similar, for example within a predetermined tolerance, it may be determined that the first class of object is present in the first portion of the second frame. In this way, only a single classifier, the first classifier, needs to be executed on the first portion of the second frame in order to determine whether the first class of object is present in the first frame. This results in a reduction of computational cost, compared with, for example, executing every classifier in the first set of classifiers on the first portion of the second frame.

In an example in which the second set of classifiers includes more than one classifier, for example a subset of the first set of classifiers, determining whether the first object is present in the first portion of the second frame may involve using the second classification data only. For example, if the second classification data includes numerical values assigned to multiple classes of object, determining whether the first class of object is present may include determining that the numerical value assigned to the first class is higher than a certain value depending on the numerical values assigned to the other classes. However, since the second set of classifiers includes fewer classifiers than the first set of classifiers, using the second set of classifiers results in a reduction of computational cost compared with executing every classifier in the first set of classifiers on the determined portion of the second frame.

In some examples, the method described above may be applied in response to determining that a size of the first portion of the first frame is greater than a certain threshold size, for example having an area greater than 10%, greater than 20%, greater than 30%, or greater than 50% of the total area of the first frame. Applying the method for smaller portions of the first frame may not result in an increase in efficiency processing the video data, for example due to overheads in determining a portion of the second frame and selecting classifiers for the determined portion of the second region.

In some examples in accordance with FIG. 1, the portion of the second feature data associated with the first portion of the second frame is processed, using the second classification data, to determine a sub-portion of the first portion of the second frame in which an object of the first class is located. In this way, a more precise region of the second frame is identified in which the object of the first class is located. Portions of subsequent frames may then be determined in dependence on the determined sub-portion, for example using the methods described with reference to FIGS. 2 and 3.

As explained above, in examples in accordance with FIG. 1, processing frame data may include processing frame data using a CNN. An example of a CNN 136 is shown schematically in FIG. 4.

Figure 4:
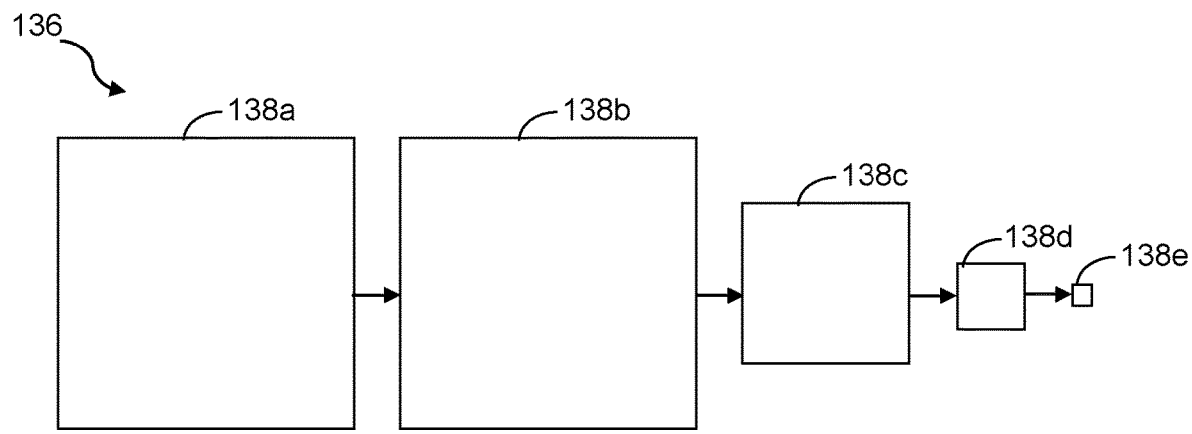
FIG. 4 shows schematically a convolutional neural network according to examples.

The CNN 136 includes a number of different layers 138a, 138b, 138c, 138d, 138e. In FIG. 2, the CNN 136 includes an input layer (138a), a plurality of convolutional layers (two of which, 138b, 138c, are shown in FIG. 4), a number of fully-connected layers (one of which, 138d, is shown in FIG. 2) and an output layer 138e. The input layer for example corresponds with an input to the CNN 136, which in this example is image data. The image data is for example 224 pixels wide and 224 pixels high and includes 3 color channels (such as a red, green and blue color channel). The convolutional layers typically extract particular features from the input data, to create feature maps. The fully-connected layers then use the feature maps for classification. In the example of FIG. 4, the output of the second layer 138b undergoes pooling before it is input to the third layer 138c. Pooling for example allows values for a region of an image or a feature map to be aggregated or combined, for example by taking the highest value within a region or the average value within a region. For example, with 2×2 max pooling, the highest value of the output of the second layer 138b within a 2×2 patch of the feature map output from the second layer 138b is used as an input to the third layer 138c, rather than transferring the entire output of the second layer 138b to the third layer 138c. This reduces the amount of computation for subsequent layers of the CNN 136. This is shown schematically in FIG. 4 as a reduction in size of the third layer 138c compared to the second layer 138b. Further pooling is performed between the third and fourth layers 138c, 138d and between the fourth and fifth layers 138d, 138e. It is to be appreciated that the CNN 136 of FIG. 4 has been greatly simplified for ease of illustration and that typical CNNs may be significantly more complex.

Feature maps generated by some or all of the convolutional layers of the CNN 136 may be processed by the application of an activation function. An activation function (sometimes referred to as a rectifier) may be used to map an input to a predefined output, such as a value which is 0 or greater. A suitable activation function is the rectified linear unit (ReLU) function, although other activation functions are possible. By using an activation function, non-linearity may be introduced to the output of a convolutional layer or pooling layer, which increases the expressiveness of features maps that may be generated by subsequent convolutional layers.

In a CNN, a fully-connected layer typically connects every neuron in one layer to every neuron in another layer, and may be used to identify overall characteristics of an image, such as whether the image includes a particular object. In the example of FIG. 4, a fully-connected layer 138d is connected to a number of output neurons (also referred to as fully-connected kernels) in the output later 138e. Each output neuron in the output layer 138e corresponds to a classifier for a particular class of object. In the present example, the activations of the output neurons are passed through a softmax activation function, which normalizes the outputs to be in the range [0, 1] and to have a sum of 1. In this example, the pre-softmax activations of the output neurons, or alternatively the normalized activations generated by passing the pre-softmax activations through the softmax activation function, may be considered as classification data. It is to be appreciated that other classifiers may be used to determine classification data from feature data output by convolutional layers of a CNN, for example support vector machines (SVMs).

In general, neural networks such as the CNN 136 of FIG. 4 may undergo what is referred to as a training phase, in which the neural network is trained for a particular purpose. A neural network typically includes a number of interconnected nodes, which may be referred to as artificial neurons, or neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights may be adjusted throughout training, altering the output of individual neurons and hence of the neural network as a whole.

In the example of FIG. 4, the CNN 138 has been trained to classify image data, for example to determine whether an object of a particular class is present in the image represented by the image data. Training the CNN 138 in this way for example generates one or more kernels associated with at least some of the layers (such as layers of the neural network 136 other than the input layer 138a and the output layer 138e). The kernels for example allow features of an image to be identified. For example, some of the kernels may be used to identify edges in the image represented by the image data and others may be used to identify horizontal or vertical features in the image (although this is not limiting, and other kernels are possible). The precise features that the kernels identify will depend on the class of object that the CNN 136 is trained to identify. The kernels may be of any size. As an example, each kernel may be a 3 by 3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3 by 3 image patch) or each element of a feature map by a weight in the kernel before adding the result of this operation to the result of the same operation applied to neighboring pixels or neighboring feature map elements. A stride for example refers to the number of pixels or feature map elements a kernel is moved by between each operation. A stride of 1 therefore indicates that, after calculating the convolution for a given 3 by 3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as an accumulation operation). Thus, a neural network accelerator, which may be dedicated to implementing a neural network, may include a multiplier-accumulator (MAC) unit configured to perform these operations.

As explained above, in examples in accordance with FIG. 1, processing feature data to determine a portion of a frame in which a class of object is located may include processing the feature data using a DCNN. An example of a DCNN 140, which is associated with the CNN 136 of FIG. 4, is shown schematically in FIG. 5.

Figure 5:
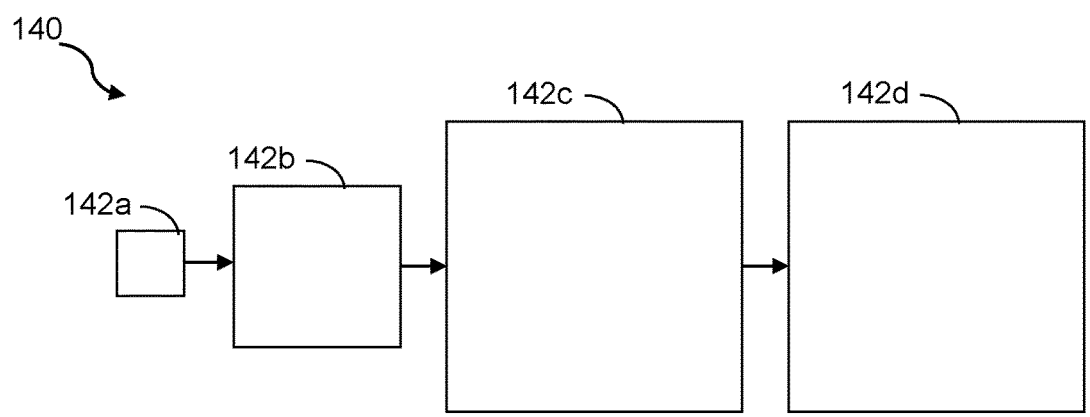
FIG. 5 shows schematically a deconvolutional neural network according to examples.

The DCNN 140 includes a number of different layers 142a, 142b, 142c, and 142d. In FIG. 5, the DCNN 140 includes an input layer (142a), a plurality of deconvolutional layers (two of which, 142b, 142c, are shown in FIG. 4), and an output layer 142d. The number of deconvolutional layers in the DCNN 140 may be equal to or less than the number of convolutional layers in the CNN 136. The input layer corresponds with an input to the DCNN 142, which in this example includes data generated by a fully connected layer of the CNN 136 (for example, fully connected layer 138d). In other examples, feature maps generated by a convolutional layer of a CNN may instead be passed through a DCNN.

The deconvolutional layers, sometimes referred to as transposed convolutional layers, revert the spatial transformation performed by associated convolutional layers of the CNN 136. Accordingly, if a layer of the CNN 136 reduces a spatial size of an input feature map by a given amount, the associated deconvolutional layer increases the spatial size of an input feature map by the same amount. In the example of FIG. 5, the output of the first layer 142a undergoes unpooling before it is input to the second layer 142b. Each unpooling layer in the DCNN 140 is associated with a pooling layer in the CNN 140, and results in increasing the size of an input feature map. This is shown schematically in FIG. 5 as an increase in size of the first layer 142a compared to the second layer 142b. Further unpooling is performed between the second and third layers 142b, 142c. It is to be appreciated that the DCNN 140 of FIG. 5 has been greatly simplified for ease of illustration and that typical DCNNs may be significantly more complex. Data generated by some or all of the deconvolutional layers of the DCNN 140 may be processed by the application of an activation function, as described above with reference to the CNN 136.

The output layer 142*d* of the DCNN 140 corresponds to a heat map with different pixel colors indicating probabilities of the different classes. Processing image data to generate an output of this type is referred to as semantic segmentation.

It will be appreciated that methods according to FIG. 1 may be applied to separate portions of the second frame, for example where different classes of objects are determined to be located in different portions of the first frame. A further portion of the second frame may overlap the first portion of the second frame or may be non-overlapping with the first portion of the second frame. Accordingly, examples according to FIG. 1 may further include processing a further region of the second portion using a different set of classifiers.

Figure 6:
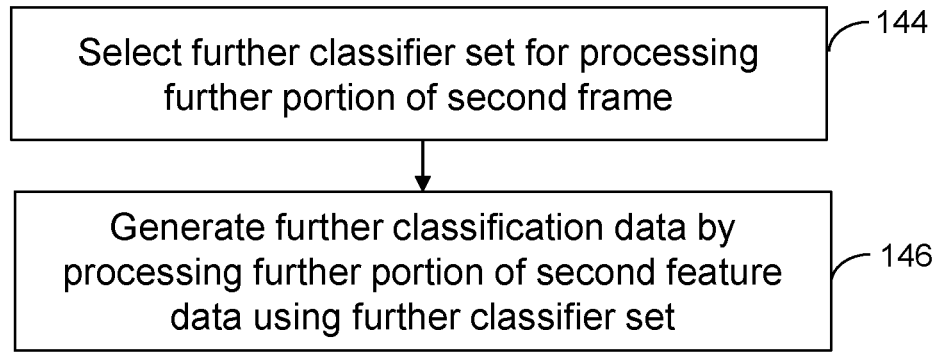
FIG. 6 is a flow diagram showing a method of processing video data according to examples.

At item 144 of FIG. 6, a further set of classifiers is selected for processing a further portion of the second frame. The further set of classifiers may be different from the second set of classifiers, for example because a different class of image is determined to be located in a further portion of the first frame, and the further portion of the second frame is determined in dependence on the further portion of the first frame. At item 146 of FIG. 6, further classification data is generated by processing a further portion of the second feature data associated with the further portion of the second frame.

In some examples according to FIG. 6, the method of FIG. 1 is applied to one or more portions of the second frame, and then a default set of classifiers, for example the first set of classifiers used to generate the first classification data, may be used to process feature data derived from any remaining portions of the second frame. This may be the case, for example, if applying the method of FIG. 1 to the remaining portions of the second frame is not expected to result in an increase in the efficiency of processing the second frame, for example because no sufficiently large object is expected to be located in the remaining portion.

By processing different portions of the second feature data using different sets of classifiers, as described above with reference to FIG. 6, the second frame may be more efficiently processed. In some examples, a second frame may be divided into two or more portions according to the method of FIG. 1, and portions of the second frame data associated with the two or more portions may be processed separately to generate the second feature data. For example, a first processing operation may be performed to generate the portion of the second feature data associated with the portion of the second frame determined at item 108 of FIG. 1, and a second processing operation may be performed to generate a further portion of the second feature data associated with a further portion of the second frame. The separately generated portions of the second feature data may then be combined to generate the second feature data. This may result in an increase in the efficiency of generating the second feature data, as well as the efficiency of subsequently generating classification data from the second feature data.

In an example in which the second feature data is generated by executing convolutional layers of a CNN using a CNN accelerator, different portions of the second feature data may be generated by executing the convolutional layers of the CNN separately on different portions of the second frame data, for example by first executing the convolutional layers on the first portion of the second frame, and then executing the CNN layers on a further portion of the second frame. This method may reduce the memory bandwidth required to generate the second feature data. This may allow the CNN accelerator to generate the second feature data using buffers within the CNN accelerator, as opposed to using external memory, increasing the efficiency and speed at which the second feature data can be generated. In some examples, such segmenting of the second frame data to generate the second feature data may allow the CNN layers to be processed together in a fused manner, as will be understood by those of ordinary skill in the art.

In an example in which the second feature data is generated by executing convolutional layers of a CNN using a CNN accelerator, different portions of the second feature data may be generated by executing the convolutional layers of the CNN separately on different portions of the second frame data, for example by first executing the convolutional layers on the first portion of the second frame, and then executing the CNN layers on a further portion of the second frame. This method may reduce the memory bandwidth required to generate the second feature data. This may allow the CNN accelerator to generate the second feature data using buffers within the CNN accelerator, as opposed to using external memory, increasing the efficiency and speed at which the second feature data can be generated. In some examples, such segmenting of the second frame data to generate the second feature data may allow the CNN layers to be processed together in a fused manner, as will be understood by those of ordinary skill in the art.

Figure 7:
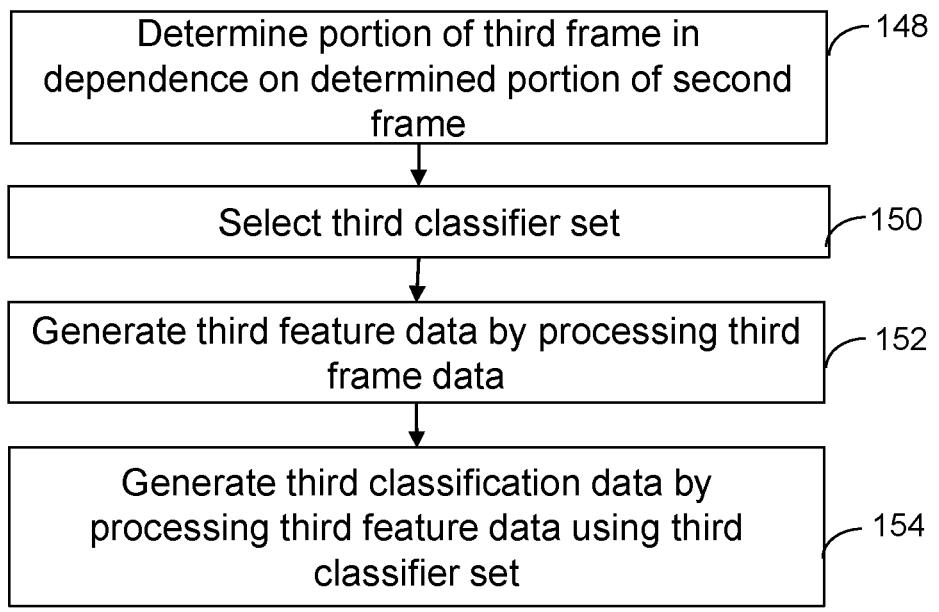
FIG. 7 is a flow diagram showing a method of processing video data according to examples.

In some examples, a video processed according to the method of FIG. 1 further includes a third frame. In an example where the second frame is subsequent to the first frame, the third frame is subsequent to the second frame. The third frame may be immediately consecutive to the second frame (with no intervening frames therebetween) or there may be one or more frames between the second frame and the third frame. FIG. 7 shows an example of a method of processing a third frame of a video. At item 148 of FIG. 7, a portion of the third frame is determined in dependence on the first portion of the second frame. In an example, determining the portion of the third frame includes processing the portion of the second feature data associated with the first portion of the second frame, using the second classification data, to determine a sub-portion of the first portion of the second frame in which an object of the first class is located, and determining the portion of the third frame in dependence on the determined sub-portion. The portion of the third frame may be determined from the first portion of the second frame, or the determined sub-portion of the second frame, using one of the methods described with reference to FIG. 2 or 3, for example. At item 150 of FIG. 7, a third set of classifiers is selected on the basis of the first classification data. The first set of classifiers includes the first classifier, but may be different from the second set of classifiers used to process the first portion of the second frame. At item 152, third frame data associated with the third frame is processed to generate third feature data representative of at least one feature of the third frame. At item 154 of FIG. 4, a portion of the third feature data associated with the determined portion of the third frame.

Figure 8:
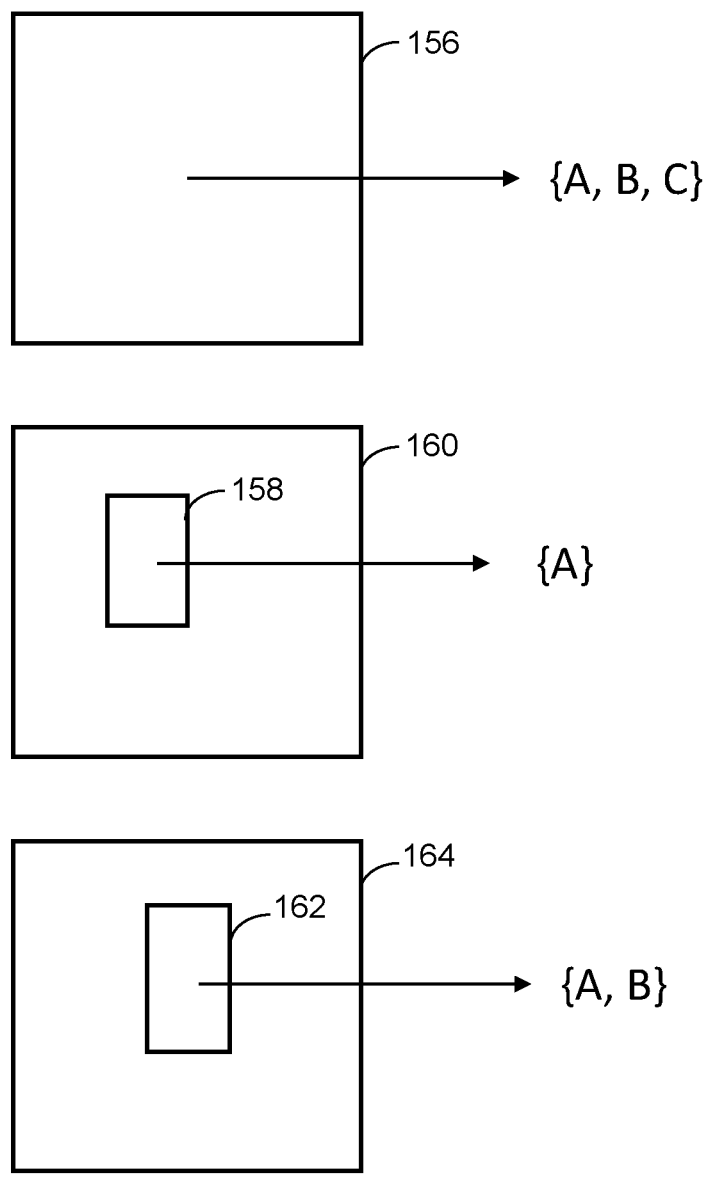
FIG. 8 shows schematically three frames of a video according to examples.

Selecting different sets of classifiers for different frames, as described with reference to FIG. 7, may be more efficient than using the same set of classifiers for each frame. In the example of FIG. 8, a first set of classifiers associated with the set of classes {A, B, C} is executed on a first frame 156. In this example, first classification data is generated, including numerical values assigned to each of the classes A, B, and C. Using the method of FIG. 1, it is determined that an object of class A is expected to be found in a first portion 158 of a second frame 160. A second set of classifiers is selected for processing the first portion 158 of the second frame 160. In this example, the second set of classifiers includes only a first classifier associated with class A. It is subsequently determined that the object of class A is located within the first portion 158 of the second frame 160, and hence that the object of class A is expected to be located within a portion 162 of a third frame 164. A third set of classifiers is selected for processing the portion 162 of the third frame 164. The third set of classifiers is selected on the basis of the first classification data. In this example, the first classification data assigns a relatively high value to class B and a relatively low value to class C. In this example, the third set of classifiers is associated with the set of classes {A, B}. Occasionally executing classifiers other than the first classifier associated with class A, on the basis with the first classification data, other classes of object may be identified in the determined portions of the subsequent frames, without needing to run a full set of classifiers on the determined portions of each frame.

As mentioned above, methods described above are applicable in cases where a scene or environment in a video is either relatively stationary, or moves with a known or measured velocity. Furthermore, the methods are applicable where the content of the environment or scene does not change significantly from frame to frame. However, at certain points in a video, an environment or scene may change significantly, for example if a video camera is moved from a first room of a building to a second room of the building. Such a change of the scene of environment will result in a difference between frames captured before the change and frames captured after the change.

In an example, a video containing a first frame and a second frame is processed in accordance with the method of FIG. 1. The video includes a further first frame and a further second frame. The further first frame is processed in accordance with items 100 to 106 of FIG. 1. However, in this example the further second frame is not processed in accordance with the remaining items of FIG. 1. Instead, further feature data, representative of at least one feature of the further second frame, is generated as described with reference item 112 of FIG. 1, and a further set of classifiers is then selected on a different basis to the basis used for selecting the second set of classifiers. The further set of classifiers is used to process the further feature data to generate further classification data. In one example, the further set of classifiers is the same as the set of classifiers used to process the further first frame. In other words, the further first frame and the further second frame may be processed in the same manner. One reason for selecting the further set of classifiers on a different basis to the second set of classifiers is that a difference between a portion of the further first frame and a corresponding portion of the further second frame is greater than a predetermined difference.

Figure 9:
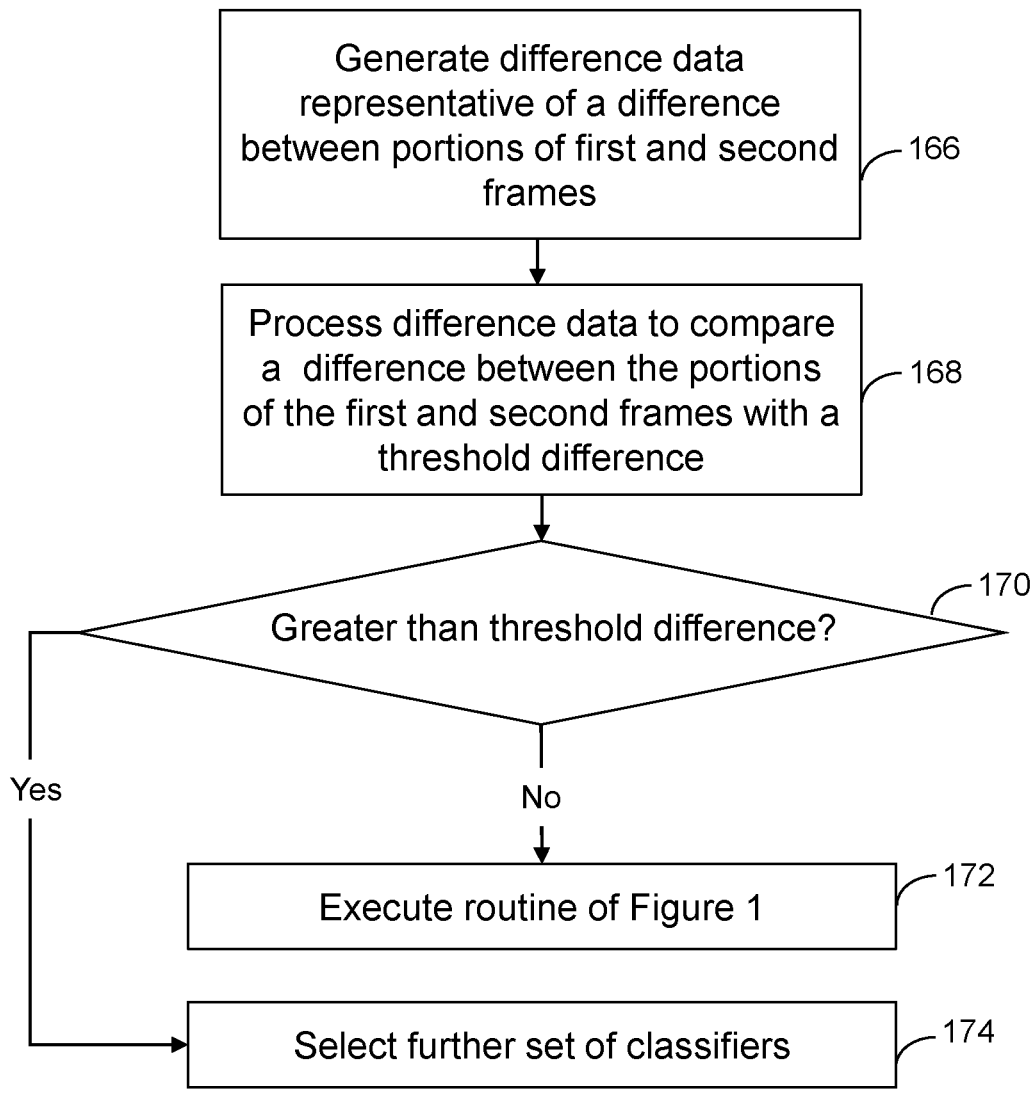
FIG. 9 is a flow diagram showing a method of comparing two frames of a video.

FIG. 9 shows an example of a method of selecting a basis for processing a second frame of a video. At item 166 of FIG. 9, difference data is generated, representative of a difference between a portion of the first frame and a corresponding portion the second frame. In an example where a scene in a video is relatively stationary, the corresponding portion of the second frame may be identically located to the portion of the first frame. In an example where a scene in a video moves with a known velocity (for example, because a camera moves with a known or measured velocity relative to an environment), the corresponding portion of the second frame may be displaced form the portion of the first frame in accordance with the known velocity. The portion of the first frame and the portion of the second frame may each composed of several smaller portions having different locations in the first frame and the second frame respectively.

The difference data may for example be generated by calculating a difference between first pixel values of pixels of the first frame and second pixel values of corresponding pixels of the second frame. A pixel value may be representative of an intensity of the light captured by a sensor pixel, which may be proportional to the number of photons captured by that sensor pixel. The intensity may represent a luminance of the captured light, which is for example a measure of the intensity of light per unit area rather than an absolute intensity. In other examples, the pixel value may be representative of a brightness of captured light, which may be considered to correspond to a perception of a luminance, which may or may not be proportional to the luminance. In general, the pixel value may represent any photometric quantity or characteristic that may be used to represent the visual appearance of the pixel. A pixel value may be associated with a particular color channel (such as red, green or blue) or may include a plurality of sub-values associated with each of a plurality of color channels.

To calculate the difference between the first frame and the second frame, the first pixel values may be subtracted from the second pixel values. This may generate a difference between the portion of the first frame and the corresponding portion of the second frame. This calculation may be performed on a pixel-by-pixel basis and may be combined, for example by summation, to determine an overall difference representative of an overall difference between the portion of the first frame and the portion of the second frame.

Alternatively, difference data may be representative of a difference between a first signature representative of a portion of the first frame and a second signature representative of a corresponding portion of the second frame. A signature is for example any data which is representative of a content of a portion of a frame. For example, a signature may be obtained by applying a hashing algorithm to the frame portions. A hashing algorithm is for example a one-way algorithm in which an output (referred to as a hash) is deterministic such that the application of the hashing algorithm again to exactly the same input data will produce the same hash. A hash may be of a fixed length, which may be relatively small, and smaller than frame data representative of the frame portion itself. In this way, the first and second signatures may represent the portions of the first and second frames in a manner which is efficient in terms of storage requirements and processing use.

Other signatures or characteristics may be used to represent a content of portions of the first and second frames. For example, a separate signature may be derived for most and least significant bits of a frame, and compared for two different frames to determine the similarity between these frames and hence the likelihood that subsequent frames may also be similar.

To reduce memory bandwidth, the difference data may be generated at a relatively early stage in a video processing pipeline, such as by an image signal processor (ISP) or video codec, as described in further detail with reference to FIG. 10. However, this is not intended to be limiting, and in other cases the difference data may be generated at a later stage, such as by a neural network accelerator for implementing a CNN in examples in which the first and/or second feature detection operations include the use of a CNN. For example, rather than generating a delta frame, a difference calculation may be performed using a layer of a neural network such as a CNN, for example a convolutional layer for determining a feature map associated with an input. In such cases, the difference may be between features detected using part of the first feature detection operation, such as a first subset of steps of the first feature detection operation in examples in which the first feature detection operation includes a plurality of steps.

Item 170 of FIG. 9 involves processing the difference data to compare a difference between the portion of the first frame and the corresponding portion of the second frame with a threshold difference. At item 172, it is determined whether the difference greater or less than the threshold difference.

If the difference between the portion of the first frame and the corresponding portion of the second frame is determined to be less than the threshold difference, the routine of FIG. 1 is executed, as it is deemed that there is sufficient continuity between the first and second frame that the method of FIG. 1 is likely to result in more efficient processing of the second frame.

Conversely, if the difference between the portion of the first frame and the corresponding portion of the second frame is determined to be greater than the threshold difference, a further set of classifiers is selected for processing the second frame, for example the same set of classifiers used to process the first frame, as it is deemed that there is not sufficient continuity between the first and second frame that the method of FIG. 1 is likely to result in more efficient processing of the second frame.

In the example above, difference data is generated to determine whether portions of a first frame and a second frame are similar. This method is applicable when it is known or believed that a scene in the video is substantially stationary, or alternatively when a velocity of the scene is known. In other examples, the method described above for comparing portions of a first frame and a second frame may be used alternatively or additionally to measure a velocity of a scene and/or a relative displacement associated with two frames. For example, by generating difference data between a portion of a first frame and several candidate portions of a second frame, it can be determined which of the candidate portions of the second frame corresponds to the portion of the first frame. In this way, a displacement associated with the first frame and the second frame may be determined. The determined displacement can then be used, for example, to determine a first portion of the second frame in dependence as described with reference to FIG. 3.

Figure 10:
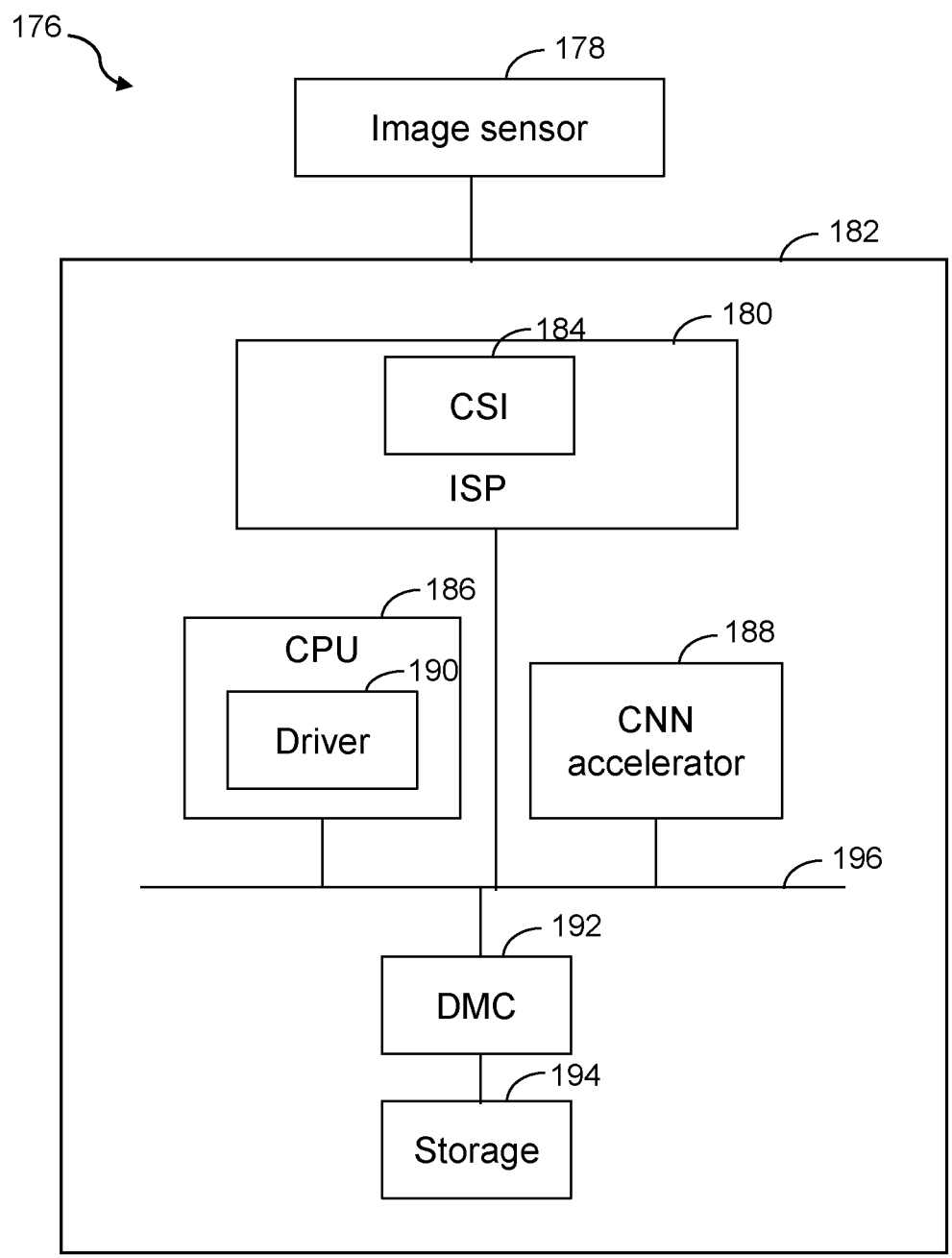
FIG. 10 shows schematically components of a video processing system according to examples.

An example of a video processing system 176 for use with the methods described herein is shown schematically in FIG. 10. The video processing system 176 of FIG. 10 may be coupled to or form part of a computer device, such as a personal computer, a laptop, a smartphone or an on-board computer device which may be coupled to or mounted within a vehicle such as a car.

The video processing system 176 includes an image sensor 178. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 178 in this example is arranged to capture video data, which may be in the form of a series of images captured sequentially, with each image corresponding to a frame of the video.

In FIG. 10, the image sensor 178 is arranged to transfer video data to an image signal processor (ISP) 180 of a computing system 182 via a camera serial interface (CSI) 184. The ISP 180 may perform initial processing of video data (such as individual frames of the video) to prepare the video for display. For example, the ISP 180 may perform saturation correction, renormalization, white balance adjustment and/or demosaicing, although this is not to be taken as limiting.

The computing system 182 of FIG. 10 includes at least one processor. The at least one processor is for example configured to perform the methods described herein. In this example, the computing system 182 includes a central processor unit (CPU) 186. The computing system 182 also includes a CNN accelerator 188, which is a processor dedicated to implementing processing of data, including feature detection, using a CNN as described above. In other examples, though, the first and/or second feature detection operations, which may include a neural network, may be implemented using a more general processor, such as the CPU or a GPU.

In other examples, the computing system may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 186 of FIG. 10 includes a driver 190 which for example provides an interface between software configured to control or configure the CNN and the CNN accelerator 188, which is configured to perform the processing to implement the neural network (in this example in which a neural network is used for the feature detection operation). The driver 190 may therefore form part of or correspond to a control system for controlling the operation of the at least one processor.

The computing system 182 of FIG. 10 also includes a dynamic memory controller (DMC) 192 which may be used to control access to storage 194 of the computing system 182. The storage 182 is for example configured to store the video data received from the ISP 180.

The storage 194 is for example external to the neural network accelerator 184 and may be a random access memory (RAM) such as DDR-SDRAM (double data rate synchronous dynamic random access memory). In other examples, the storage 194 may be or include a non-volatile memory such as Read Only Memory (ROM) or a solid state drive (SSD) such as Flash memory. The storage 194 in examples may include further storage devices, for example magnetic, optical or tape media, compact disc (CD), digital versatile disc (DVD) or other data storage media. The storage 194 may be removable or non-removable from the computing system 182. In examples, the CNN accelerator 188 may also include local storage including one or more buffers, which may nevertheless be considered to form part of the storage of the video processing system 176.

The components of the computing system 176 in the example of FIG. 10 are interconnected using a systems bus 196. This allows data to be transferred between the various components. The bus 196 may be or include any suitable interface or bus. For example, an ARM® Advanced Microcontroller Bus Architecture (AMBA®) interface, such as the Advanced eXtensible Interface (AXI), may be used.

It is to be appreciated that the video processing system 176 of FIG. 10 is merely an example and other video processing systems may be used in other examples.

The above examples are to be understood as illustrative examples. Further examples are envisaged. For example, where it is determined to be very likely that the first class of object is present in the first portion of the second frame, the second classification stage may be omitted completely, such that only feature detection and localization operations are performed on the first portion of the second frame. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A computer-implemented method of processing video data representative of a video comprising a first frame and a second frame, the method comprising:
processing first frame data associated with the first frame to generate first feature data representative of at least one feature of the first frame;
processing the first feature data using a first set of classifiers, the first set of classifiers comprising a plurality of classifiers including a first classifier for a first class of object, to generate first classification data associated with a plurality of classes of object;
determining, using the first classification data, that the first class of object is present in the first frame;
processing the first feature data to determine a first portion of the first frame in which an object of the first class is located;
determining a first portion of the second frame in dependence on the determined portion of the first frame;
selecting a second set of classifiers on the basis of the first classification data, the second set of classifiers comprising at least one classifier including the first classifier;
processing second frame data representative of the second frame to generate second feature data representative of at least one feature of the second frame;
processing, using the second set of classifiers, a portion of the second feature data associated with the determined portion of the second frame to generate second classification data; and
determining, using the second classification data, whether the first class of object is present in the first portion of the second frame.

2. The method of claim 1, wherein determining whether the first class of object is present in the first portion of the second frame comprises:
comparing the second classification data with a portion of the first classification data associated with the first class of object; and
determining, from a result of the comparison, whether the first class of object is present in the first portion of the second frame.

3. The method of claim 1, comprising processing, using the second set of classifiers, the portion of the second feature data associated with the first portion of the second frame to determine a sub-portion of the first portion of the second frame in which an object of the first class is located.

4. The method of claim 1, wherein:
the second set of classifiers includes a second classifier for a second class of object; and
second classification data is further associated with the second class of object.

5. The method of claim 1, wherein the second set of classifiers is a subset of the first set of classifiers.

6. The method of claim 1, wherein:
processing the first frame data to generate the first feature data comprises processing the first frame data using a convolutional layer of a convolutional neural network (CNN); and
processing the first feature data to generate the first classification data comprises processing the first feature data using a fully-connected layer of the CNN.

7. The method of claim 1, wherein processing the second frame data to generate second feature data comprises:
performing a first processing operation to generate the portion of the second feature data associated with the first portion of the second frame; and
performing a second processing operation to generate a further portion of the second feature data associated with a further portion of the second frame.

8. The method of claim 7, wherein processing the first feature data to determine the first portion of the first frame in which an object of the first class is located comprises processing the first feature data using a deconvolutional neural network (DCNN) associated with the CNN.

9. The method of claim 1, comprising:
selecting a further set of classifiers, the further set of classifiers being different from the second set of classifiers; and
processing, using the further set of classifiers, a further portion of the second feature data associated with a further portion of the second frame to generate further classification data associated with one or more of the plurality of classes of object.

10. The method of claim 1, wherein the video comprises a third frame, the method comprising, in response to determining that the first class of object is present in the first portion of the second frame:
determining a portion of the third frame in dependence on the first portion of the second frame;
selecting a third set of classifiers on the basis of the first classification data, wherein the third set of classifiers includes the first classifier and is different from the second set of classifiers;
processing third frame data associated with the third frame to generate third feature data representative of at least one feature of the third frame; and
processing a portion of the third feature data using the third set of classifiers to generate third classification data associated with the one or more of the plurality of classes of object.

11. The method of claim 10, wherein determining the portion of the third frame comprises:
processing the portion of the second feature data associated with the first portion of the second frame, using the second classification data, to determine a sub-portion of the first portion of the second frame in which an object of the first class is located; and
determining, in dependence on the determined sub-portion, the portion of the third frame.

12. The method of claim 1, wherein the video comprises a further first frame and a further second frame, the method comprising selecting, on a different basis to the basis used for selecting the second set of classifiers, a further set of classifiers for processing further second feature data representative of at least one feature of the further second frame.

13. The method of claim 12, comprising selecting the further set of classifiers in response to determining that a difference between a portion of the further first frame and a portion of the further second frame is greater than a predetermined difference.

14. The method of claim 13, wherein determining that the difference between the portion of the further first frame and the portion of the further second frame is greater than a predetermined difference comprises:
   generating difference data representative of a difference between a portion of the further first frame and a portion of the further second frame; and
   processing the generated difference data to determine whether the difference between the portion of the further first frame and the portion of the further second frame is greater than the predetermined difference.

15. The method of claim 1, wherein the first portion of the second frame encompasses a region of the second frame corresponding to the first portion of the first frame.

16. The method of claim 1, wherein determining the first portion of the second frame comprises:
   determining a relative displacement associated with the first frame and the second frame; and
   displacing the first portion of the first frame in accordance with the determined relative displacement.

17. The method of claim 1, comprising determining that a size of the first portion of the first frame is greater than a threshold size.

18. The method of claim 1, wherein frames of the video correspond to observations of an environment by an agent performing simultaneous localization and mapping (SLAM), and wherein determining the first portion of the second frame comprises:
   processing frames of the video to generate SLAM data representative of a map of an environment and a location of the agent in the environment;
   determining, using the generated SLAM data, a relative displacement associated with the first frame and the second frame; and
   displacing the first portion of the first frame in accordance with the determined relative displacement.

19. A system for processing video data representative of a video comprising a first frame and a second frame, the system comprising processing circuitry and memory circuitry, wherein the memory circuitry holds program code which, when executed by the processing circuitry, causes the system to:
   process first frame data associated with the first frame to generate first feature data representative of at least one feature of the first frame;
   process the first feature data using a first set of classifiers, the first set of classifiers comprising a plurality of classifiers including a first classifier for a first class of object, to generate first classification data associated with a plurality of classes of object;
   determine, using the first classification data, that the first class of object is present in the first frame;
   process the first feature data to determine a first portion of the first frame in which an object of the first class is located;
   determine a first portion of the second frame in dependence on the determined portion of the first frame;
   select a second set of classifiers on the basis of the first classification data, the second set of classifiers comprising at least one classifier including the first classifier;
   process second frame data representative of the second frame to generate second feature data representative of at least one feature of the second frame;
   process, using the second set of classifiers, a portion of the second feature data associated with the first portion of the second frame to generate second classification data; and
   determine, using the second classification data, whether the first class of object is present in the first portion of the second frame.

20. A non-transitory storage medium comprising instructions which, when executed by processing circuitry of a computing device, cause the computing device to perform a method of processing video data representative of a video comprising a first frame and a second frame, the method comprising:
   processing first frame data associated with the first frame to generate first feature data representative of at least one feature of the first frame;
   processing the first feature data using a first set of classifiers, the first set of classifiers comprising a plurality of classifiers including a first classifier for a first class of object, to generate first classification data associated with a plurality of classes of object;
   determining, using the first classification data, that the first class of object is present in the first frame;
   processing the first feature data to determine a first portion of the first frame in which an object of the first class is located;
   determining a first portion of the second frame in dependence on the determined portion of the first frame;
   selecting a second set of classifiers on the basis of the first classification data, the second set of classifiers comprising at least one classifier including the first classifier;
   processing second frame data representative of the second frame to generate second feature data representative of at least one feature of the second frame;
   processing, using the second set of classifiers, a portion of the second feature data associated with the determined portion of the second frame to generate second classification data; and
   determining, using the second classification data, whether the first class of object is present in the first portion of the second frame.

* * * * *